United States Patent [19]

Yoshimura et al.

[11] Patent Number: 4,678,069

[45] Date of Patent: Jul. 7, 1987

[54] CLUTCH CONTROL SYSTEM WITH VARIABLE CLUTCH CONNECTION POSITION

[75] Inventors: Hiroshi Yoshimura, Yokohama; Toshihiro Hattori, Ayase, both of Japan

[73] Assignee: Isuzu Motors Limited, Tokyo, Japan

[21] Appl. No.: 834,370

[22] Filed: Feb. 28, 1986

[30] Foreign Application Priority Data

Feb. 28, 1985 [JP] Japan .................................. 60-39375

[51] Int. Cl.$^4$ ............................................ F16D 66/00
[52] U.S. Cl. ............................. 192/0.033; 192/0.076; 192/82 T; 192/103 R
[58] Field of Search .................. 192/0.076, 0.075, 0.07, 192/0.032, 0.033, 103 R, 3.58, 0.052, 0.092, 82 T

[56] References Cited

U.S. PATENT DOCUMENTS

| | | | |
|---|---|---|---|
| 4,509,124 | 4/1985 | Suzuki et al. | 192/3.58 X |
| 4,519,484 | 5/1985 | Nagaoka et al. | 192/3.58 X |
| 4,558,772 | 12/1985 | Grimes et al. | 192/0.076 |
| 4,591,038 | 5/1986 | Asagi et al. | 192/103 R X |

OTHER PUBLICATIONS

Japanese Laid-Open Publication Abstract, No. 60-11722, Jan. 22, 1985.

Primary Examiner—George H. Krizmanich
Attorney, Agent, or Firm—Staas & Halsey

[57] ABSTRACT

A clutch control system includes an electronic control apparatus for controlling a clutch based on clutch control data stored through a learning process. The clutch control system has a sensor for measuring the temperature of lubricating oil in a gear transmission, a memory for storing a corrective clutch control value commensurate with the temperature of the lubricating oil, and an electronic control apparatus for correcting a learned value used to control the clutch with the corrective clutch control value obtained on the basis of the measured temperature of the lubricating oil.

16 Claims, 8 Drawing Figures

Fig. 3

| OIL TEMPERATURE (°C) | -30 | -10 | 10 | 30 | 50 | 70 | 90 | 110 |
|---|---|---|---|---|---|---|---|---|
| CORRECTIVE TERM B | 0A | 8 | 6 | 4 | 2 | 0 | 0 | 0 |

Fig. 4

| ROTATIONAL SPEED OF INPUT SHAFT (rpm) | 0 | 100 | 200 | 300 | 400 | 500 | 600 | 700 |
|---|---|---|---|---|---|---|---|---|
| CORRECTIVE VALUE (INPUT SHAFT) | 0 | 0 | -2 | -1 | 0 | 1 | 2 | 4 | ic control apparatus. One such system is described in Japanese Patent Application No. 58-119166 (Japanese Laid-Open Publication No. 60-11722), for example.
CLUTCH CONTROL SYSTEM WITH VARIABLE CLUTCH CONNECTION POSITION

BACKGROUND OF THE INVENTION

1. Field of the Invention

The present invention relates to a clutch control system for use in an automatic transmission automobile.

2. Description of the Prior Art

There have been developed in recent years automatic transmission automobiles in which various mechanisms are controlled by an electronic control apparatus. In some such automatic transmission automobiles, a clutch control system is controlled by an electronic control apparatus. That is, a friction clutch, such as a dry-type single-disc clutch, is driven by a clutch actuator comprising a piston movable in a cylinder under hydraulic pressure, with the clutch actuator being controlled by the electronic control apparatus. One such system is described in Japanese Patent Application No. 58-119166 (Japanese Laid-Open Publication No. 60-11722), for example.

In such a clutch control system, the position of a partly connected clutch is learned by the electronic control apparatus and stored, and the position at which to start connecting the clutch (i.e., the position to start partly connecting the clutch) is automatically controlled on the basis of this learned value. According to the value learning process, the clutch is gradually connected from the condition in which the gear transmission is in the neutral position and the clutch is completely disconnected. The clutch position at a time T1 when the engine speed Ve and the speed of rotation Vi of an input shaft have reached certain values, is determined to be the position to start connecting the clutch, as shown in FIGS. 7 and 8.

With the clutch control system having such a learning capability, the viscosity of lubricating oil used to lubricate the gear transmission varies when the temperature of the lubricating oil changes with variations in the ambient temperature of the automobile. This results in an increase or a reduction in the drag torque of the gear transmission. As a consequence, the learned value of the position to start connecting the clutch is varied. If the automobile is started using the learned value, the engine tends to rev up before the clutch is partly connected, or the clutch may not be smoothly transferred to a partly connected condition.

SUMMARY OF THE INVENTION

It is an object of the present invention to provide a clutch control system capable of learning an accurate position to start connecting a clutch.

Another object of the present invention is to provide a clutch control system for use in automatic transmission automobiles, which can obtain a learned value commensurate with a variation in ambient temperature.

According to the present invention, there is provided a clutch control system including an electronic control apparatus for controlling a clutch based on clutch control data stored through a learning process, the clutch control system having means for measuring the temperature of lubricating oil in a gear transmission, means for storing a corrective clutch control value commensurate with the temperature of the lubricating oil, and means for correcting a learned value used to control the clutch by employing the corrective clutch control value obtained on the basis of the measured temperature of the lubricating oil.

Since the clutch control system of the invention includes means for correcting the learned value with a variation in the temperature of the lubricating oil for the gear transmission at the time of learning the position to start connecting the clutch, the position to start connecting the clutch can automatically be controlled more accurately.

The above and other objects, features and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 3 is a diagram of a map of temperatures of lubricating oil for a gear transmission and corrective terms B based thereon;

FIG. 4 is a diagram of a map of rotational speeds of an input shaft and corrective terms C based thereon;

DESCRIPTION OF THE PREFERRED EMBODIMENT

Figure 1:
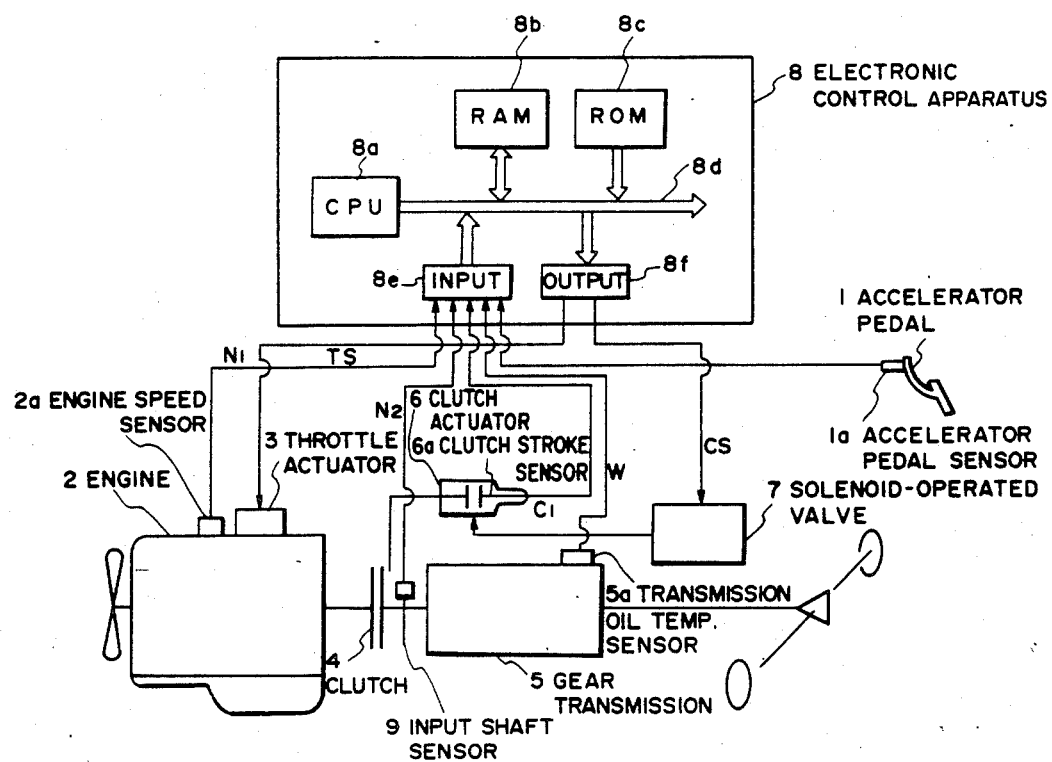
FIG. 1 is a schematic diagram, partly in block form, of a clutch control system according to an embodiment of the present invention.
Figure 5:
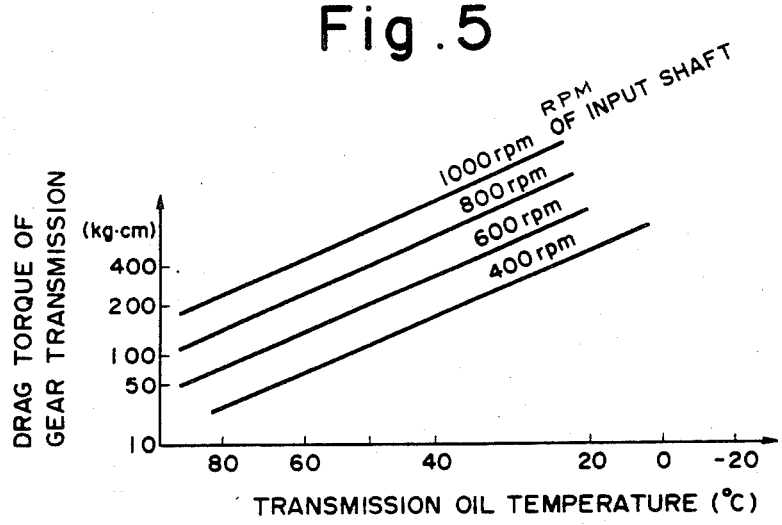
FIG. 5 is a graph of the relationship between the lubricating oil temperature and the drag torque of the gear transmission.

As shown in FIG. 1, the speed of travel of an automobile into which a clutch control system of the present invention is incorporated, is regulated by an accelerator pedal 1. The depth to which the accelerator pedal 1 is depressed is detected by an accelerator pedal sensor 1a. The automobile is powered by a gasoline engine 2. The speed of rotation of the output shaft of the engine 2 is measured by an engine speed sensor 2a. The opening of the throttle valve of the engine is controlled by a throttle actuator 3 in dependence upon the depth to which the accelerator pedal 1 is depressed. The output shaft of the engine 2 is coupled to a clutch 4 which may be a dry-type single-disc clutch, a dry-type multiple-disc clutch, a wet-type multi-disc clutch, or a wet-type single-disc clutch. The clutch 4 is coupled to a gear transmission 5 comprising parallel gears. The temperature of lubricating oil for the gear transmission 5 is measured by a transmission oil temperature sensor 5a. The clutch 4 is driven by a clutch actuator 6 comprising a piston movable in a cylinder under hydraulic pressure. The range of operation of the clutch 4, i.e., the operative position of a release bearing or a release fork, is detected by a clutch stroke sensor 6a. The clutch actuator 6 is driven by a solenoid-operated valve 7 which supplies hydraulic pressure from a hydraulic pressure source in the automobile to the clutch actuator 6. An electronic control apparatus 8 comprising a microcomputer carries out necessary computations based on commands from the driver or information from various detectors in the automobile, and applies operation commands to devices to be controlled. Examples of the operation commands generated by the electronic control apparatus are a gear shift command for the gear transmission to select an optimum gear position, as derived from the depth to which the accelerator pedal 1 is depressed and a automobile speed signal from an automobile speed sensor (not shown in FIG. 1), a clutch operation speed command to be applied when connecting or disconnecting the clutch, and a learned command for the position to connect the clutch. The electronic control apparatus 8 generally comprises a central processing unit (CPU) 8a, a random-access memory (RAM) 8b for storing various data items such as learned data of the position to connect the clutch, and a read-only memory (ROM) 8c. The ROM 8c stores a program to control various devices in the automatic transmission automobile, a map (FIG. 3) of temperatures of lubricating oil in the gear transmission 5 and corrective terms B based thereon, a map (FIG. 4) of rotational speeds of an input shaft and corrective terms C based thereon, a graph (FIG. 5) of the relationship between the temperature of the lubricating oil and the drag torque of the gear transmission, and a graph (FIG. 6) of the relationship between the clutch position and the drag torque of the clutch. The electronic control apparatus 8 also includes a bus 8d interconnecting the central processing unit 8a, the random-access memory 8b, the read-only memory 8c, and a data input device 8e for entering a rotational speed signal N1 from the engine speed sensor 2a, a rotational speed signal N2 from an input shaft speed sensor 9, a clutch position signal C1 from the clutch stroke sensor 6a, and an oil temperature signal W from the transmission oil temperature sensor 5a. The electronic control apparatus 8 serves to correct the position at which to start partly connecting the clutch 4 based on the learned value of the position which has been obtained by executing the steps identified by the flowchart of FIG. 2, and to enable the automobile to start based on the corrected position. The electronic control apparatus also includes a data output device 8f for outputting signals from the electronic control apparatus 8, such as a signal TS to control the throttle actuator 3 and a clutch control signal CS to be applied to the solenoid-operated valve 7.

Figure 2:
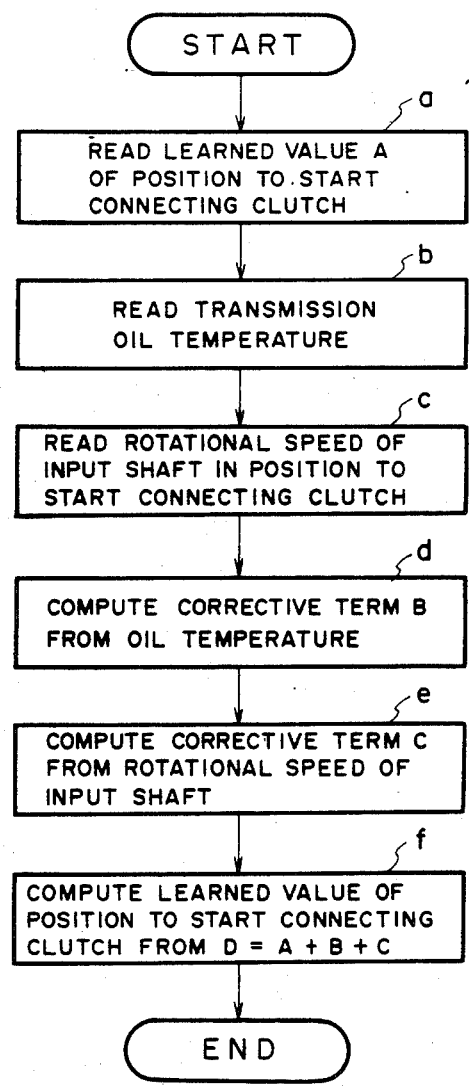
FIG. 2 is a flowchart for the operation of the clutch control system of the invention.

The operation to start the automatic transmission automobile and the manner in which the position to start partly connecting the clutch is learned in the clutch control system of the invention, will be described with reference to the flowchart of FIG. 2.

When the automatic transmission automobile is at rest and the engine 2 is stopped, the clutch 4 is disconnected, and the gear transmission 5 is in the forward, low gear position, for example. As the driver shifts the shift lever (not shown) to a neutral gear position "N" and turns on the ignition key switch in order to start the automobile, the various electric components of the automobile are supplied with a voltage, so that the electronic control apparatus 8 and the other electric components are energized. At this time, the clutch control signal CS is generated by the electronic control apparatus 8 according to the program stored therein, to thereby disconnect the clutch 4. When the driver turns the ignition key switch to a starting position, the engine 2 is started. When the driver shifts the shift lever to a gear position "D" and depresses the accelerator pedal, the disconnected clutch 4 is driven by the clutch control signal CS from the electronic control apparatus 8. At this time, the electronic control apparatus 8 uses the learned value of the partly connected clutch position which is stored in the RAM 8b. Based on the stored learned value, the clutch 4 is gradually moved from the disconnected position via the partly connected position to the connected position, allowing the automatic transmission automobile to start moving. The starting operation of the automatic transmission automobile is well known, and will not be described in more detail.

According to the present invention, a learning process for determining the clutch operation when the automatic transmission automobile starts moving is determined by the following steps:

In a first step a, a stored learned value A of the position at which to start connecting the clutch 4 is read from the electronic control apparatus 8. (In the automatic transmission automobile, the position at which to start connecting the clutch is learned under the conditions that the gear transmission 5 is in the neutral gear position and the clutch 4 is driven from the disconnected position to the connected position while the engine 2 is rotating. The learned value A obtained in such an operation is stored in the electronic control apparatus 8, and the old learned value A which has been stored is updated by the new data.)

Then, the temperature of the lubricating oil in the gear transmission 5 is read by the oil temperature sensor 5a in a second step b.

Thereafter, the rotational speed of the input shaft at the position at which to start connecting the clutch 4 is derived from a rotational speed signal N2 from the input shaft sensor 9 and is stored in a third step c.

Figure 6:
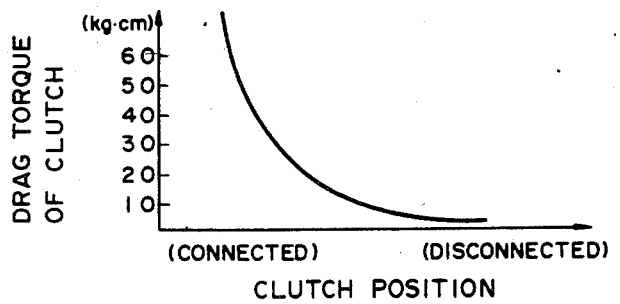
FIG. 6 is a graph of the relationship between the clutch position and the drag torque of a clutch.
Figure 7:
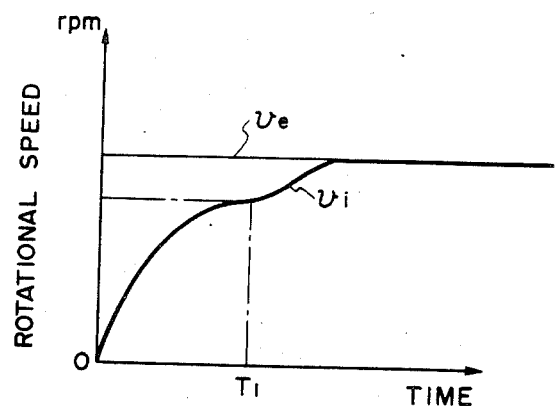
FIG. 7 is a graph illustrating the manner in which the rotational speed of an engine and the rotational speed of an input shaft vary with time.
Figure 8:
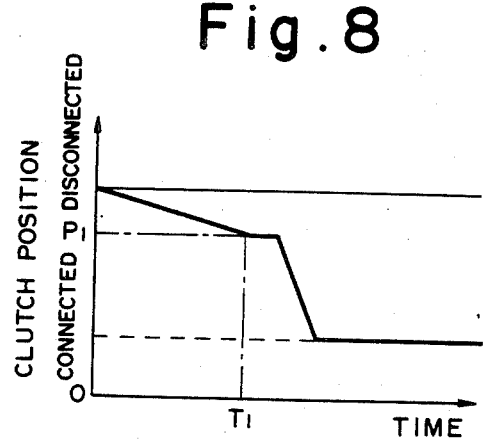
FIG. 8 is a graph illustrating the manner in which the clutch position varies with time.

In a fourth step d, a corrective term B is computed on the basis of the stored value of the oil temperature through interpolation from the map (FIG. 3) of the transmission oil temperatures and the corrective terms B, and is stored. The map of FIG. 3 is employed to obtain the corrective term B based on the variation of the drag torque of the gear transmission 5 with respect to the temperature of the lubricating oil for the gear transmission 5 (FIG. 5), and also on the graph of the relationship between the drag torque and the clutch position (FIG. 6).

Then, a corrective term C is computed from the rotational speed of the input shaft in a fifth step e. At this time, the rotational speed N2 of the input shaft is computed through interpolation from the map (FIG. 4) of the stored rotational speeds of the input shaft and the corrective terms C.

Data D on the position at which to start connecting the clutch is computed in a sixth step f according to the following equation:

$$D = A + B + C$$

The data D is stored as a new learned value A in the electronic control apparatus 8. The clutch actuator 6 is driven according to the new learned value to smoothly actuate the clutch 4 as it starts to be partly connected.

Although a preferred embodiment has been shown and described, it should be understood that many changes and modifications may be made therein without departing from the scope of the appended claims.

What we claim is:

1. A clutch control system for controlling a clutch to transmit and cut off rotation from an automobile engine to wheels of the automobile, said clutch control system comprising:

a gear transmission, having lubricating oil, for changing the speed of the transmitted rotation from the automobile engine;

a clutch, coupled between the automobile engine and said gear transmission, for transmitting rotation from the automobile engine to said gear transmission;

a clutch actuator, coupled to said clutch, for operating said clutch between a connected position and a disconnected position with respect to the automobile engine;

means for learning and storing a learned value corresponding to a position at which to start connecting said clutch;

means, coupled to said gear transmission, for detecting the temperature of the lubricating oil of said gear transmission;

means for storing a corrective clutch control value corresponding to the detected temperature of the lubricating oil; and means, coupled to said learning means and said storing means, for correcting the learned value by the corrective clutch control value derived from the detected temperature of the lubricating oil to provide a new learned value.

2. A clutch control system according to claim 1, wherein said gear transmission comprises a parallel-gear-type gear transmission.

3. A clutch control system according to claim 1, wherein said clutch comprises a dry-type single-disc clutch.

4. A clutch control system according to claim 1, wherein said clutch comprises a dry-type multiple-disc clutch.

5. A clutch control system according to claim 1, wherein said clutch comprises a wet-type single-disc clutch.

6. A clutch control system according to claim 1, wherein said clutch comprises a wet-type multiple-disc clutch.

7. A clutch control system for a vehicle having an engine with a rotatable output shaft, having a gear transmission with a rotatable input shaft and having a clutch for coupling the rotation of the output shaft of the engine to the input shaft of the gear transmission, the gear transmission for changing the speed of the transmitted rotation from the engine and having lubricating oil, said clutch control system comprising:

means for learning and storing a learned value corresponding to a position at which to start connecting the clutch;

means, coupled to the gear transmission, for detecting the temperature of the lubricating oil of the gear transmission;

an electronic control apparatus including:

means for storing a first set of corrective clutch control values corresponding to the possible detected temperatures of the lubricating oil;

means, coupled to said storing means, said detecting means and said learning means, for selecting the stored corrective clutch control value corresponding to the detected temperature of the lubricating oil and for correcting the stored learned value in accordance with the corrective clutch control value to provide a new learned value; and means, coupled to said selecting and correcting means, for providing a clutch control signal based on the new learned value; and means, coupled to the clutch and said means for providing a clutch control signal, for actuating the clutch based on the clutch control signal so as to move the clutch between a connected position and a disconnected position.

8. A clutch control system according to claim 7, further comprising means for detecting the rotational speed of the input shaft of the gear transmission, wherein said electronic control apparatus further comprises means for storing a second set of corrective clutch control values corresponding to the possible rotational speeds of the input shaft, and wherein said selecting and correcting means comprises means for selecting the stored corrective clutch control value corresponding to the detected temperature of the lubricating oil, for selecting the stored corrective clutch value corresponding to the detected rotational speed of the input shaft, and for correcting the learned value with the selected corrective clutch control values to provide the new learned value.

9. A clutch control system according to claim 8, wherein said clutch comprises a dry-type single-disc clutch.

10. A clutch control system according to claim 9, wherein said gear transmission comprises a parallel-gear-type gear transmission.

11. A clutch control system according to claim 8, wherein said clutch comprises a dry-type multiple-disc clutch.

12. A clutch control system according to claim 11, wherein said gear transmission comprises a parallel-gear-type gear transmission.

13. A clutch control system according to claim 8, wherein said clutch comprises a wet-type single-disc clutch.

14. A clutch control system according to claim 13, wherein said gear transmission comprises a parallel-gear-type gear transmission.

15. A clutch control system according to claim 8, wherein said clutch comprises a wet-type multiple disc clutch.

16. A clutch control system according to claim 15, wherein said gear transmission comprises a parallel-gear-type gear transmission.

* * * * *